US011416931B2

(12) United States Patent
Hill et al.

(10) Patent No.: US 11,416,931 B2
(45) Date of Patent: Aug. 16, 2022

(54) INVESTMENT FUND TOKEN OWNERSHIP

(71) Applicant: Salt Blockchain Inc., Denver, CO (US)

(72) Inventors: Matthew Hill, Centennial, CO (US);
Gregory Bell, Denver, CO (US);
Shawn Owen, Westminster, CO (US)

(73) Assignee: SALT BLOCKCHAIN INC., Denver, CO (US)

( * ) Notice: Subject to any disclaimer, the term of this patent is extended or adjusted under 35 U.S.C. 154(b) by 245 days.

(21) Appl. No.: 16/357,209

(22) Filed: Mar. 18, 2019

(65) Prior Publication Data
US 2019/0287175 A1 Sep. 19, 2019

Related U.S. Application Data

(60) Provisional application No. 62/643,754, filed on Mar. 16, 2018.

(51) Int. Cl.
*G06Q 40/04* (2012.01)
*G06Q 20/36* (2012.01)
(Continued)

(52) U.S. Cl.
CPC ......... *G06Q 40/04* (2013.01); *G06Q 20/0658* (2013.01); *G06Q 20/367* (2013.01); *G06Q 20/3829* (2013.01); *H04L 9/3236* (2013.01); *H04L 9/3239* (2013.01); *H04L 9/3247* (2013.01); *H04L 2209/38* (2013.01); *H04L 2209/56* (2013.01)

(58) Field of Classification Search
USPC .................................................. 705/35–45
See application file for complete search history.

(56) References Cited

U.S. PATENT DOCUMENTS 9,704,143 B2 * 7/2017 Walker ................ G06Q 20/065
10,282,558 B2 * 5/2019 Chan ..................... H04L 9/3239
(Continued)

OTHER PUBLICATIONS

G. Fenu, L. Marchesi, M. Marchesi and R. Tonelli, "The ICO phenomenon and its relationships with ethereum smart contract environment," 2018 International Workshop on Blockchain Oriented Software Engineering (IWBOSE), 2018, pp. 26-32 (Year: 2018).*

(Continued)

*Primary Examiner* — Mohammad Z Shaikh
(74) *Attorney, Agent, or Firm* — Perkins Coie LLP

(57) ABSTRACT

A decentralized investment fund operates according to consensus code on a shared ledger and raises capital by issuing ownership tokens on the shared ledger. The decentralized investment fund may hold digital assets in the consensus code and distribute profits to the token owners according to each owner's dividend preference. A token owner's dividend preference can include digital assets tracked by a different shared ledger, stabletoken digital assets pegged to the value of a digital asset, and cross-chain digital asset swaps. Token issuance may include a proof of accreditation requirement based on cryptographic proof on a shared ledger. The decentralized investment fund may distribute fund documents to the token holders by encrypting the document, first with a symmetric key common to all token holders, and second with an asymmetric key unique to each token holders and based on the token's holder's known public address on the shared ledger.

20 Claims, 15 Drawing Sheets

(51) Int. Cl.
*G06Q 20/06* (2012.01)
*H04L 9/32* (2006.01)
*G06Q 20/38* (2012.01)

(56) References Cited

U.S. PATENT DOCUMENTS

| | | | | |
|---|---|---|---|---|
| 10,699,340 | B2* | 6/2020 | Gordon, III | G06Q 20/0658 |
| 10,762,506 | B1* | 9/2020 | Cash | G06K 9/00087 |
| 11,017,405 | B2* | 5/2021 | Borzilleri | G06Q 40/04 |
| 2012/0011044 | A1* | 1/2012 | Vasinkevich | G06Q 40/04 |
| | | | | 705/37 |
| 2014/0108277 | A1* | 4/2014 | Dresner | G06Q 30/018 |
| | | | | 705/317 |
| 2017/0011460 | A1* | 1/2017 | Molinari | H04L 63/0823 |
| 2017/0221052 | A1* | 8/2017 | Sheng | G06Q 20/065 |
| 2019/0012660 | A1* | 1/2019 | Masters | G06Q 20/065 |
| 2019/0080407 | A1* | 3/2019 | Molinari | G06Q 20/3672 |
| 2019/0130483 | A1* | 5/2019 | de Jong | G06Q 20/389 |
| 2019/0139136 | A1* | 5/2019 | Molinari | G06F 21/645 |
| 2019/0164151 | A1* | 5/2019 | Doney | G06Q 40/04 |
| 2019/0172026 | A1* | 6/2019 | Vessenes | H04L 9/3247 |

OTHER PUBLICATIONS

"ERGO Token Standard", https:/theethereum.wiki./w/index.php/ERC20_Token_Standard, Oct. 28, 2017, pp. 1-19. (Year: 2017).*

Eskandari et al, "On the Feasibility of Decentralized Derivatives Markets", International Conference on Financial Cryptography and Data Security FC 2017: Financial Cryptography and Data Security pp. 553-567. (Year: 2017).*

Amano et al, "The Regulated Token (R-token) Standard", Feb. 2018, Harbor, Retrieved from the internet: https://harbor.com/rtokenwhitepaper.com, pp. 1-14. (Year: 2018).*

Dupont, Q., Experiments in Algorithmic Governance: A history and ethnography of "The DAO," a failed Decentralized Autonomous Organization, Jan. 2017, accessed Jan. 2, 2020 at https://www.researchgate.net/profile/Quinn_Dupont/publication/319529311_Experiments_in_Algorithmic_Governance_A_history_and_ethnography_of_The_DAO_a_failed_Decentralized_Autonomous_Organization.

Jentzsch, C., Decentralized Autonomous Organization to Automate Governance, publication date uncertain, accessed Jan. 2, 2020 at https://lawofthelevel.lexblogplatformthree.com/wp-content/uploads/sites/187/2017/07/WhitePaper-1.pdf.

Norta, A., Designing a Smart-Contract Application Layer for Transacting Decentralized Autonomous Organizations, Conference Paper in Communications in Computer and Information Science, Nov. 2016, accessed Jan. 2, 2020 at https://www.researchgate.net/profile/Alex_Norta/publication/308986556_Designing_a_Smart-Contract_Application_Layer_for_Transacting_Decentralized_Autonomous_Organizations/links/57fcddf608aeb857afa0943d.pdf.

Securities and Exchange Commission, Report of Investigation Pursuant to Section 21(a) of the Securities Exchange Act of 1934: The DAO, Jul. 25, 2017, accessed Jan. 2, 2020 at https://www.sec.gov/litigation/investreport/34-81207.pdf.

* cited by examiner

INVESTMENT FUND TOKEN OWNERSHIP

CROSS-REFERENCE TO RELATED APPLICATIONS(S)

This application claims priority to and the benefit of U.S. Provisional Application No. 62/643,754, filed Mar. 16, 2018, the disclosure of which is hereby incorporated herein in its entirety.

BACKGROUND

Investment funds may raise capital for use in economically beneficial activities. Investors in a fund, such as Limited Partners (LP), may receive profit distributions from the fund, and in some cases, may exercise control over business decisions made by the fund. Investors in some funds may transfer their ownership interests to new investors in accordance with the bylaws of the fund.

Investment funds sometimes fail to serve their investors well. Internal management processes of the investment fund may appear opaque to investors. Problems in fund management include when managers or general partners operating the fund engage in activity to enrich themselves or is in violation of the fund's bylaws. Fund managers could falsify operating documents to mislead investors. Transfer of ownership interest in the fund may also be problematic due to high transaction costs and the need to trust fund management or a third party to accurately record and track transfers of fund ownership. Distribution of income from the fund requires trusting third party banking and financial service providers to execute the distributions.

If a fund sells a financial product, such as the right to receive principal and interest payments on a loan, the purchaser of the financial product would need to trust the fund to provide accurate information regarding the loan (e.g., that documentation exists properly recording ownership of the loan, the true financial condition of an underlying asset, etc.).

SUMMARY OF THE DISCLOSURE

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Disclosed herein is a decentralized investment fund. Components of the investment fund may be implemented in code executed according to consensus rules in a decentralized network such as on a shared ledger. Other components may include investors, a fund manager, purchasers of financial products, etc. who are network participants and broadcast transactions to update a shared ledger in accordance with the implementations described herein. In an implementation, the investment fund raises capital by issuing tokens on the shared ledger to investors.

DETAILED DESCRIPTIONS

Figure 1:
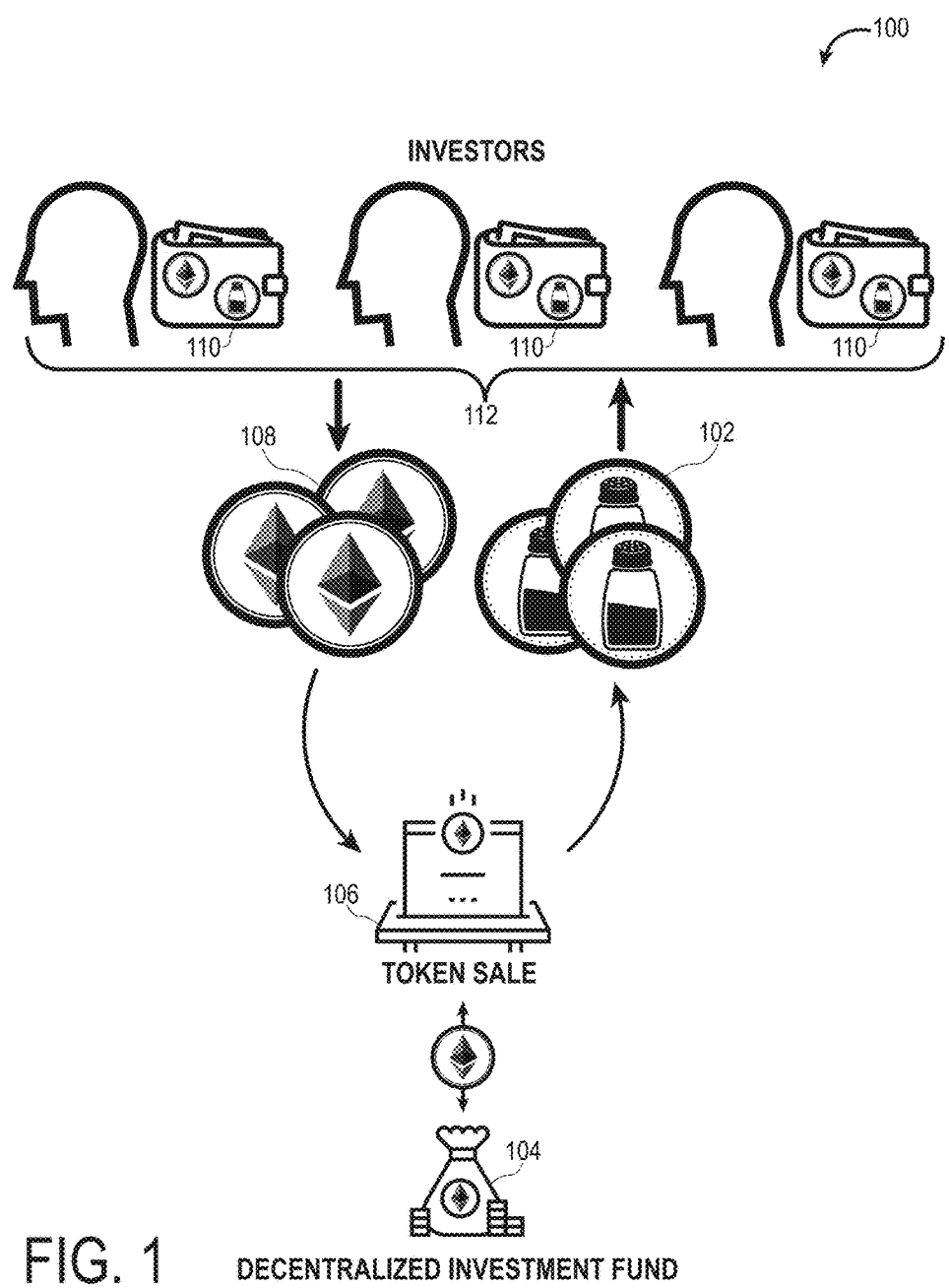
FIG. 1 is a diagram of an example decentralized investment fund system with equity ownership tokens.

FIG. 1 is a diagram of an example decentralized investment fund (referred to herein as the fund) system 100 with equity tokens 102. The fund 104 can raise capital from investors 112 by issuing equity tokens 102 in a token sale 106.

In one implementation, the token sale 106 is a smart contract executing in a decentralized network according to consensus rules. A token sale 106 may be part of a larger smart contract for managing aspects of the decentralized investment fund. The smart contract may recognize roles of the various participants in the system 100 and permit only participants in certain roles to perform operations (e.g., by calling a function of the smart contract) relating to the token sale 106, dealing equity tokens 102 (e.g., transfer to new owners), and management of the decentralized investment fund 104.

The token sale 106 (e.g., the smart contract) facilitates raising of capital for the decentralized investment fund 104 and issuance of the equity tokens 102 to investors 112. The token sale 106 receives capital contributions from individual investors 112 and records the contribution as having been made by that individual investor 112 based on an address of a wallet 110 belonging to the investor. The token sale 106 may then issue equity tokens to the wallet address 110 of the respective investors 112. A smart contract including the token sale 106 may perform further functions relating to the equity tokens 102 after issuance. For example, if one investor 112 wishes to transfer some or all of the equity tokens in her wallet 110, she may call a transfer function on the smart contract to transfer tokens from her wallet 110 to a buyer. In an implementation, a transfer function may only be called by equity token owners as recorded in a smart contract of the token sale 106 (e.g., stored on a shared ledger on which a smart contract executes).

A smart contract including the token sale 106 may permit the decentralized investment fund to call functions that other participants are not permitted to call. The decentralized investment fund 104 itself may include more than one entity with respective privileges to call functions of the smart contract including the token sale 106. Each entity is associated with a wallet address (e.g., a form of a public cryptographic key) from which a transaction must be broadcast to exercise the entity's privilege to call certain functions of the smart contract. As nonlimiting examples, the decentralized investment fund 104 may include the following: a CEO who can grant or revoke privileges to other entities (e.g., hiring and firing officers of the decentralized investment fund); a CFO who must sign off on financial transactions such as withdrawing capital from the smart contract to another wallet address from which it can be sold or paying profits to equity token holders; an equity manager for issuing new equity tokens and setting terms of limited offerings, a board of directors who can vote on proposals submitted to the smart contract, etc.

Figure 2:
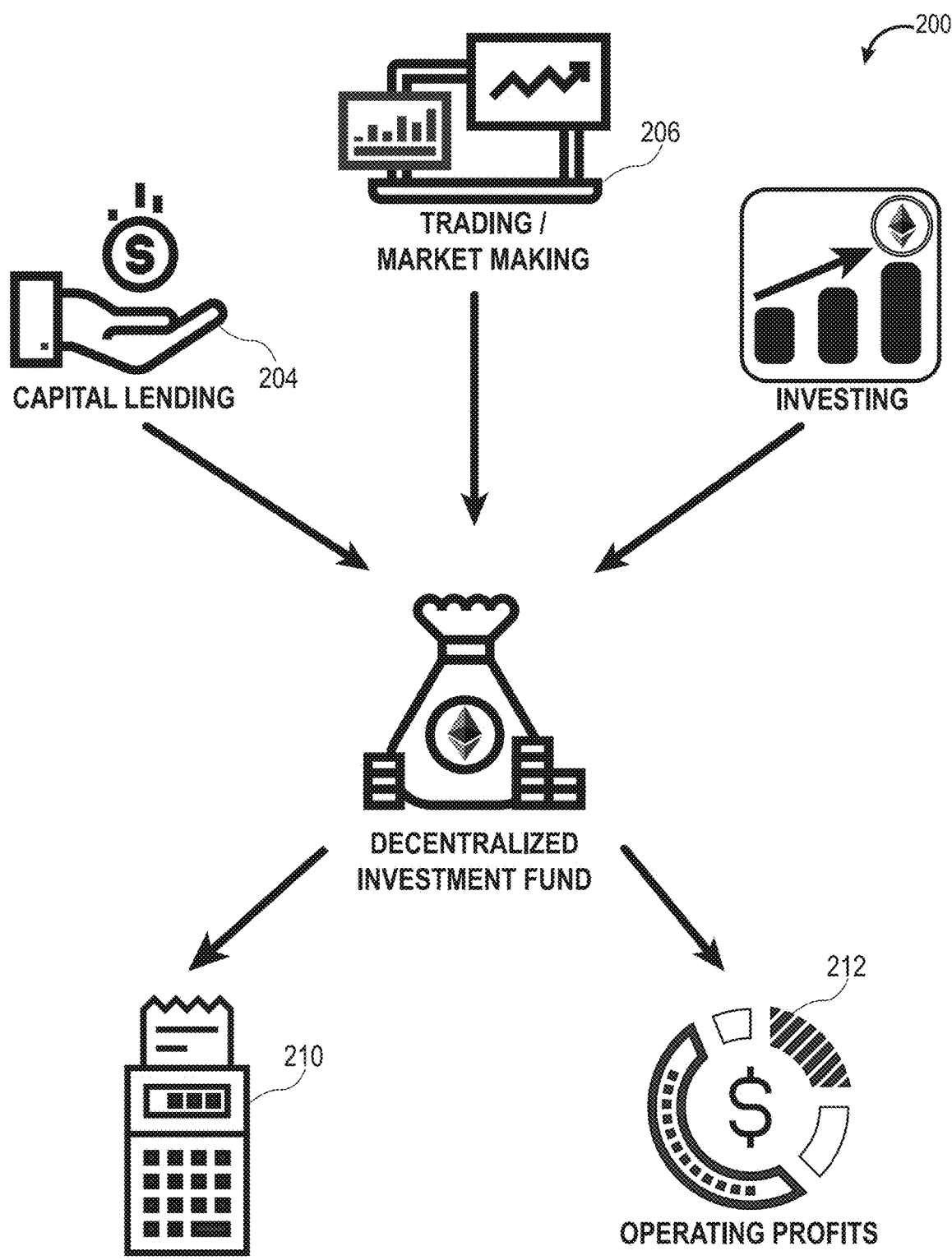
FIG. 2 is a diagram of another example system including a decentralized investment fund with equity ownership tokens.

FIG. 2 is a diagram 200 of another example system 200 including a decentralized investment fund 202 with equity tokens. The decentralized investment fund 202 has income and expenses due to its operating activities. The decentralized investment fund 202 has access to funds raised from the equity token owners. The fund 202 could withdraw a portion of the funds raised from a smart contract to a wallet address controlled by the fund 202 (e.g., withdrawal made with a transaction signed by an officer of the fund 202 with an address that is "whitelisted" with the smart contract and therefore authorized to withdraw the funds). Withdrawn funds can be converted to another currency and/or used to fund operations. In general, the decentralized investment fund 202 may perform any of the operations described herein directly (e.g., via an employee) or indirectly (e.g., paying a contractor).

One type of activity in which the decentralized investment fund 202 may engage is capital lending 204. The fund 202 may lend out capital that it raised or it may convert raised capital into another thing (e.g., a currency, commodity, etc.) to lend out. The fund 202 may manage capital lending loans 204 with activities such as repayment collection and processing and pursuing delinquent borrowers. The fund 202 may sell capital lending loans 204 to buyers who are entitled to collect repayments on the loans 204. In some implementations, as described herein, capital lending loans 204 may be "tokenized." In other words, the right to receive repayments on the loan may be associated with ownership of a token at an address on a shared ledger. For the loan to remain in good standing, the buyer must make the loan repayments to the address on the shared ledger that is associated with the token at the time of each repayment. As the token changes hands, the loan repayments would be sent to the current owner if the loan remains in good standing.

Another type of income producing activity by the decentralized investment fund 202 is trading and/or market making activities. The capital raised by the fund 202 may be either tradable on an exchange (e.g., a digital asset exchange) or exchangeable for an asset that is tradable on an exchange (e.g., national currency, commodity, another digital asset, etc.). The fund 202 may engage in or contract others to engage in the trading and/or market making activities 206 to produce an income. The income may be paid (or converted and then paid) back into the decentralized investment fund 202 (e.g., converted to a digital asset tracked by a shared ledger on which a smart contract executing portions of the decentralized investment fund and transmitted to the smart contract).

Another type of income producing activity by the decentralized investment fund 202 is investing activity 208. The fund may use raised capital to purchase assets such as securities, real estate, ownership in other funds, etc. These assets may be held and interest and/or income collected thereon. The assets may be sold for a gain, thus producing income to the fund 202.

The decentralized investment fund 202 also has expenses. One type of expense is the fund's operating costs 210. The operating costs 210 may include employee costs and contractor costs. These costs may be paid out directly from a smart contract including the fund 202 or it may be converted to another asset (e.g., national currency) before payment. The fund 202 may pay out fees and other costs associated with the income producing activities described herein including new business development activities.

Another type of expense is disbursements of profit 212 to the equity token holders. The disbursements may be to wallet address associated with the respective token holders in a digital asset tracked by a shared ledger on which the equity tokens are held (e.g., a token on the ethereum network). The disbursements may be made from the fund upon the calling of a profit disbursement function on a smart contract by an entity associated with the fund 202 with authority to trigger profit disbursements (e.g., a transaction from an address whitelisted as the CFO's address). In other implementations, a profit disbursement may be made automatically by the smart contract upon satisfaction of a condition (e.g., pay out profits when the value of the smart contract rises above a threshold).

Another way to make a cross-chain payout is for the nodes of the shared ledger to broadcast a transaction to the network of the other digital asset. For example, a smart contract of the decentralized investment fund 202 on the ethereum network may contain instructions for nodes of the network to form a transaction paying out bitcoin to an investor. Once the nodes of the ethereum network record the transaction in the ethereum blockchain, the investor may obtain a copy of the transaction from a copy of the ethereum shared ledger and broadcast it himself to the bitcoin network. Alternatively, a third-party service may scan the ethereum blockchain for valid transactions on another chain (e.g., bitcoin) and broadcast those transactions on to the network of the appropriate digital asset without intervention or action by the investor.

Figure 3:
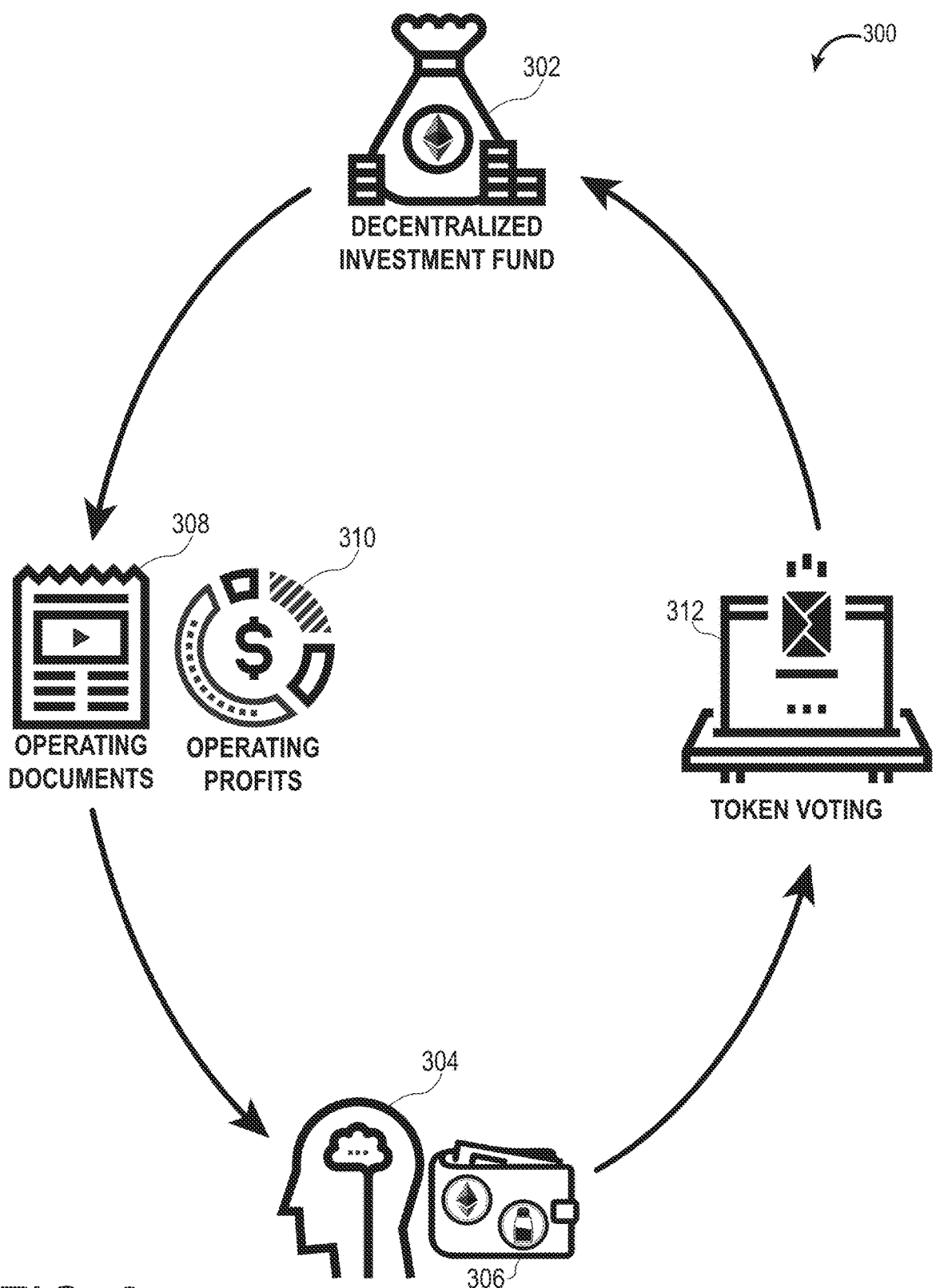
FIG. 3 is a diagram of an example decentralized investment fund system with equity tokens having dividend distributions, fund document dissemination, and investor voting.

FIG. 3 is a diagram of an example decentralized investment fund system 300 with equity tokens having income distributions and investor voting. The implementation illustrated in FIG. 3 shows interactions between the investors 304 and the decentralized investment fund 302. The left side of FIG. 3 illustrates interactions initiated by the fund 302. Operating profits 310 may be sent to an investor 304 holding equity tokens in her wallet 306. Distribution of operating profits may include a single-chain transaction or a cross-chain transaction depending on whether the investor 304 has elected to receive profit payouts on the same distributed ledger as a smart contract of the decentralized investment fund 302.

Another interaction between the fund 302 and an investor 304 is the sharing of operating documents relating to the fund 302. In an implementation, a smart contract of the fund 302 includes instructions to periodically create documents 308 relating to the financial condition of the fund 302. The documents 308 include without limitation a cash flow statement of the fund 302, a balance sheet of the fund 302, a profit-and-loss statement of the fund 302, an accounting of assets and liabilities of the fund 302, an account of receipts payable and expenses due, etc. The operating documents 308 may be shared publicly or they may be encrypted such that only holders of equity tokens may access the documents. One way of encrypting operating documents 308 is to use the public wallet address (or a transformation thereof) of wallet 306 associated with an equity token to encrypt the documents 308. The documents 308 are encrypted such that only a private key paired with the public wallet address may decrypt the operating documents 308.

Another type of interaction between the investors 304 and the fund 302 is voting of the equity tokens 312. Investors may call functions of a smart contract of the fund 302 (e.g., functions that may only be called by token holders based on the wallet addresses of wallets 306 associated with equity tokens) to vote on proposals published by the fund 302.

Figure 4:
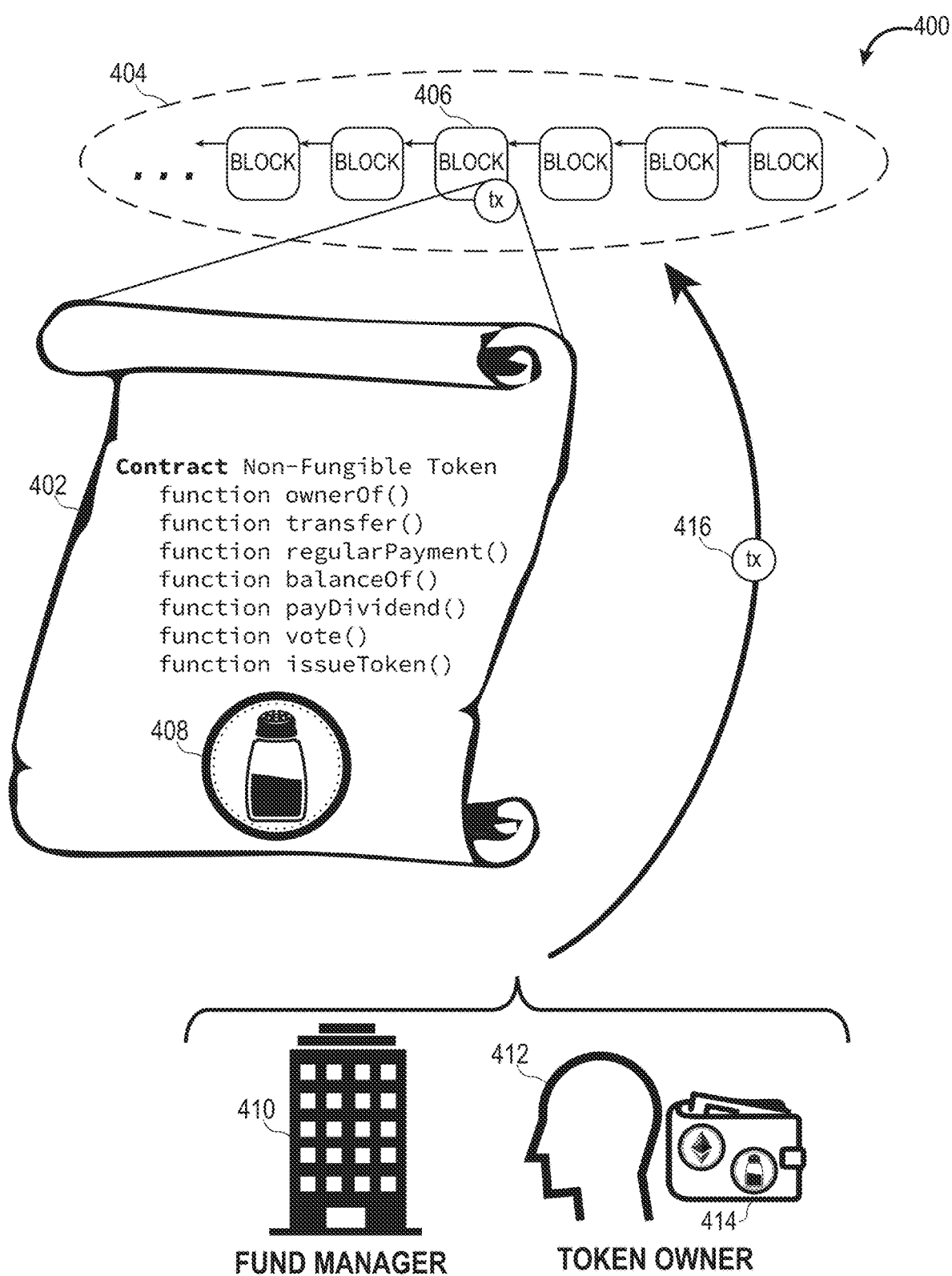
FIG. 4 is a diagram of an example system including a decentralized investment fund with a fund manager and investor participants.

FIG. 4 is a diagram of an example system 400 including a decentralized investment fund with a fund manager and investor participants. In the example illustrated in FIG. 4, the equity token 408 is implemented as a smart contract 402 on the shared ledger 404. The smart contract 402 was added to the shared ledger 404 at a block height 406. Once the smart contract 402 is included in the shared ledger 404, participants, such as fund manager 410 and investor 412, may broadcast transaction 416 to the network of the shared ledger 404 to call functions of the smart contract 402.

In implementations, the decentralized investment fund may consist of multiple components working together to perform the steps disclosed herein. The multiple components may include a mix of on-chain and off-chain components. In other words, some components of the investment fund may be encoded as a smart contract on shared ledger 404 and other components may be included in a fund manager entity. Functions of the smart contract 402 may be available to be called only by authorized individuals (e.g., "whitelisted addresses"). Individuals may be authorized by whitelisting a wallet address associated with the individual. For example, an officer of the investment fund may control an address authorized to issue new tokens to raise more capital. This officer could call the issueToken( ) function of the smart contract 402 to permit issuance of the token.

Figure 5:
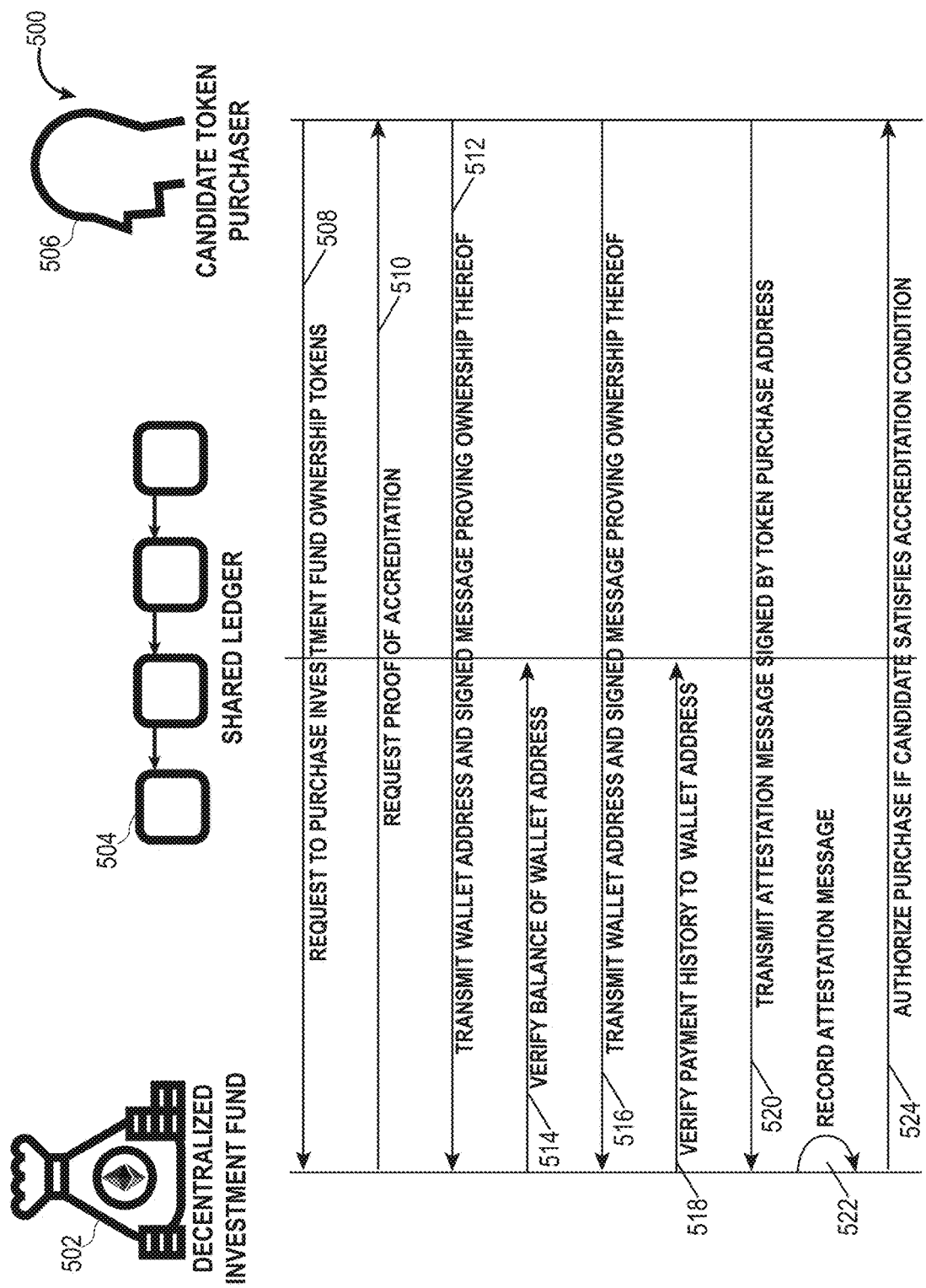
FIG. 5 is a signal diagram illustrating implementations of accredited investor verification based on a shared ledger in a decentralized investment fund.

FIG. 5 is a signal diagram 500 illustrating implementations of accredited investor verification based on a shared ledger in a decentralized investment fund. A decentralized investment fund 502 operates on a shared ledger 504 and may issue ownership tokens to candidate token purchasers 506 under certain circumstances. In some legal jurisdictions, the token may be classified as a security and only available to purchasers who satisfy accreditation requirements.

In the system 500, a candidate token purchaser 506 submits a request to purchase investment fund tokens in a purchase request 508. The purchase request may include a transaction originating from an account on the shared ledger controlled by the candidate token purchaser 506 and confirmed in the shared ledger 504. As such, the candidate token purchaser 506 may prove ownership of the shared ledger account from which the transaction was sent. In another implementation, the candidate token purchaser 506 may make the request to purchase investment fund ownership tokens outside of the shared ledger 504.

In response to the purchase request at 508, the decentralized investment fund 502 requests proof of accreditation of the candidate token purchaser 506. Satisfaction of the accreditation condition may depend on the relevant legal jurisdictions of the decentralized investment fund 502 and/or the candidate token purchaser 506. For example, the accreditation condition may be satisfied based on a minimum net worth of the candidate token purchaser 506. As such, the candidate token purchaser 506 may prove control of a sufficient amount of funds by transmitting a wallet address (e.g., account on the shared ledger 504) and a signed message proving ownership thereof at 512 to the decentralized investment fund 502. In one implementation, the signed message is a valid transaction on the shared ledger 504, such as the request itself to purchase tokens 508. In other implementations, the signed message can be from a different account on the shared ledger 504 or on a different shared ledger.

When the decentralized investment fund 502 receives the signed message 512, ownership of sufficient funds may be verified by checking the balance of the account on a copy of the shared ledger at 514.

In another implementation, the candidate token purchaser 506 may satisfy the accreditation requirement based on a minimum income level (e.g., $250,000 of income in a calendar year). In response to the request of proof of accreditation 510, the candidate token purchaser 506 may transmit a wallet address and signed message proving ownership thereof at 516. The decentralized investment fund may verify a payment history to the wallet address at 518 by checking a copy of the shared ledger 504. If the candidate token purchaser 506's wallet address (controlled by the candidate token purchaser 506 per the signed message) has received sufficient payments over a period of time included in the shared ledger 504, then the decentralized investment fund may classify the candidate token purchaser 506 as accredited.

In yet another implementation, the candidate token purchaser 506 may transmit an attestation message signed by the candidate token purchaser address on the shared ledger 504. The attestation message may include an executed statement that the candidate token purchaser 506 qualifies as an accredited investor. The decentralized investment fund 502 may record the attestation message at 522. In one implementation, the attestation message may be stored on the shared ledger 504, such as in a contract governing at least part of the decentralized investment fund 502 such that the attestation is viewable to anyone possessing a copy of the shared ledger 504.

At 524, the decentralized investment fund 502 authorizes the token purchase if the candidate token purchaser 506 satisfies the accreditation condition in one of the ways described herein. The authorization 524 may depend on receipt of digital assets on the shared ledger 504. In other implementations, the request 508 may include digital assets on the shared ledger 504 that are held by the decentralized investment fund 502 (e.g., in a contract on the shared ledger 504) until the purchase is authorized.

Figure 6:
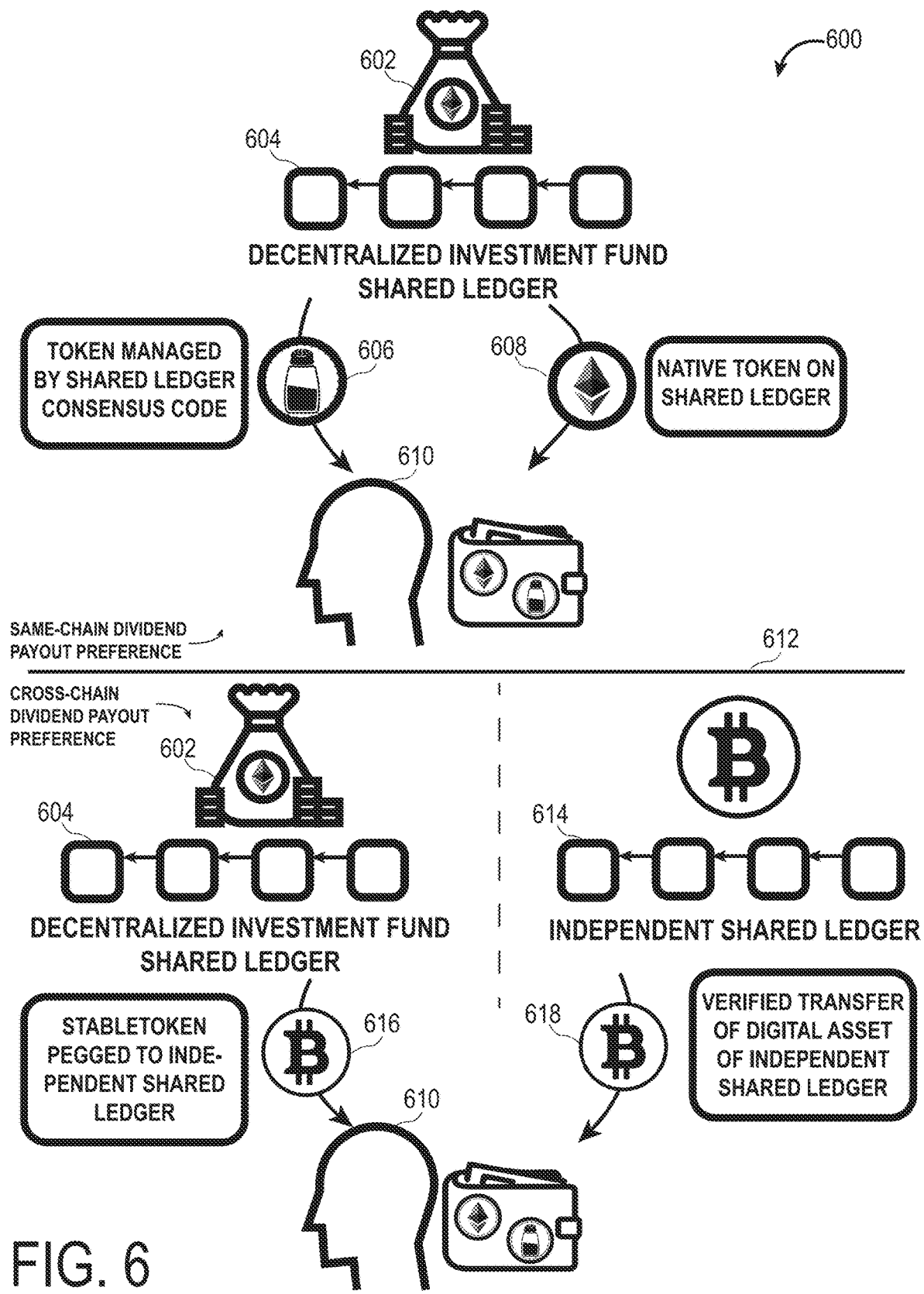
FIG. 6 is a diagram of example on-chain and cross-chain dividend payments from a decentralized investment fund to equity token owners.

FIG. 6 is a diagram 600 of example dividend payments from a decentralized investment fund 602 on a shared ledger 604 to an equity token owner 610. It may be deemed that dividend payments should be made from the decentralized investment fund 602 to token holders (e.g., by an officer of the decentralized investment fund 602 with authority to call an issueDividend( ) function). Dividend payments from the decentralized investment fund 602 may be "on-chain," meaning a digital asset tracked on the same shared ledger 604 as executes the decentralized investment fund 602, or they may be "off-chain," meaning paid in an asset tracked on a different shared ledger than the one that executes the decentralized investment fund 602. In FIG. 6, above line 612 illustrates a dividend payment on-chain and below line 612 illustrates an off-chain dividend payment.

If a dividend payment is to be made on-chain, then token 606 managed on the shared ledger 604 may be transferred to a wallet of the token holder 610. Since token holders must have an account on the shared ledger 604 from which they submitted a digital asset and received investment fund tokens, a contract on the shared ledger 604 records the accounts and their respective token balances. Even if tokens are transferred from one account to another, the new account can be recorded in the contract on the chain 604. Thus, dividend token 606 may be automatically paid out in an appropriate apportionment to all token holders 610. In a similar manner, a digital asset 608 that is native to the shared ledger 604 may be automatically paid out to token holders 610 upon the authorized execution of a payDividend( ) function.

In another implementation, token holders may be paid dividends in a digital asset not tracked on the same shared ledger 604 as the decentralized investment fund 602. Dividend payments can generally be accomplished in one of two ways: paying in a stabletoken 616 pegged to the value of a digital asset on the different shared ledger 614 or paying in a digital asset tracked on the different shared ledger 614 in such a way as the transaction of the digital asset 618 can be verified by the decentralized investment fund 602 and the dividend marked as paid on the shared ledger 604.

In the case of a stabletoken 616, the peg to the digital asset tracked on the shared ledger 614 can be maintained in several ways. In one implementation, a reserve of the digital asset on the ledger 614 can be held by a trusted party who issues the stabletoken 616 in a 1:1 ratio. Stabletokens 616 would then be redeemable for the digital asset 614 separately from the operation of the decentralized investment fund 602. In another implementation, the peg between the stabletoken 616 and the digital asset 614 can be maintained by a reserve of the digital asset 614 that exceeds that market capitalization of the stabletoken 616. If the stabletoken 616 price begins to drift away from the price of the digital asset 614, then the reserve may buy or sell stabletokens 616 to maintain the peg. In yet another implementation, an algorithmic "central bank" of the stabletoken 616 calculates parameters including aggregate demand and issues stabletoken bonds or increases stabletoken 616 supply to maintain the peg.

In the case of dividend payment in the digital asset 614, the digital asset 614 can be paid in such a way that is provable to the decentralized investment fund 602. In one implementation, the shared ledger 614 supports encumbrances on unspent transaction outputs that can represent paying the digital asset to another shared ledger (e.g., shared ledger 604). The encumbrance "locks" the digital asset on the shared ledger 614. Network participants on the shared ledger 604 can relay proof of the locked funds on the shared ledger 614, thus enabling the shared ledger 604 to treat the digital assets locked on the shared ledger 614 as circulating on its own ledger 604. If the decentralized investment fund 602 obtains the representations of the locked digital assets on its own ledger 604, the decentralized investment fund 602 can reverse the process, by destroying the representation of the digital asset 614 on the chain 604, thus freeing the locked digital asset 614 to be paid to the token holder 610 as the dividend (provided a source of information that the bridged digital asset on the chain 604 was truly destroyed).

In yet another implementation, a subset of the block headers of the different shared ledger 614 are stored by relayers on the shared ledger 604. The headers may be validated, and the validations stored on the chain 604. In this manner, a simplified version of the different shared ledger 614 is stored on the shared ledger 604. The decentralized investment fund 602 can cause a payment to be made in the digital asset 618 to the token holder 610 and verify the transaction in the simplified version of the shared ledger 614 on its own chain 604. One way to cause payment of the digital asset 618 is to pay a third party payment processor to accept the native token 608 of the shared ledger 604 in return for making the dividend payment 618 to the token holder. Once such a payment is made, the decentralized investment fund 602 can remove the dividend liability from its books based on verification of the transaction on the simplified version of the chain 614 on the chain 604, which can be done by a contract executing on the chain 604.

Figure 7:
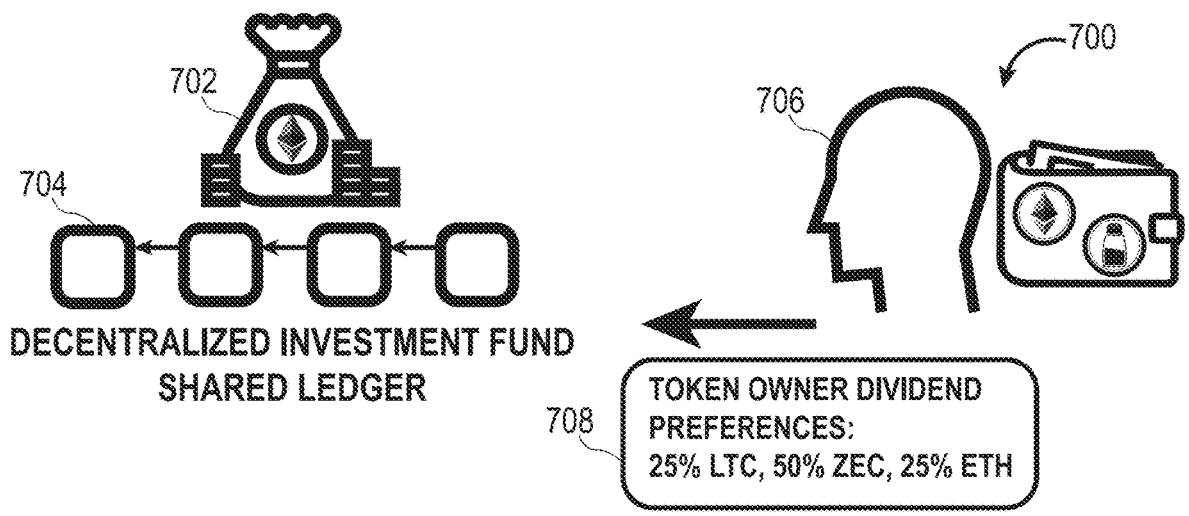
FIG. 7 is a diagram of example token owner dividend payment preferences.

FIG. 7 is a diagram 700 of example token owner dividend payment preferences. If a token holder 706 chooses to be paid dividends in a digital asset that is not the native digital asset of the chain 704 (or managed by a contract executing on the chain 704), then there will likely be a conversion between one of the digital assets on the chain 704 and the digital asset in which the token holder 706 chooses to be paid. Depending on the parameters of the conversion, a token holder 706 may deem the conversion to be uneconomical. The system 700 described herein allows a token holder 706 to submit token owner dividend preferences 708, 710, 712 to the decentralized investment fund 702 to govern the distribution of dividends to the token holder 706.

In one example, the token holder 706 submits token owner dividend preferences 708 including a preference for 25% LTC, 50% ZEC, and 25% ETH. If ETH is the native token of the shared ledger 704, then the ETH may be paid directly to the wallet address of the token holder 706. If LTC and ZEC are not native to the chain 704, then there will have to be a conversion from a native digital asset to LTC and ZEC.

Instructions 710 set out the rules desired by token holder 706 for the conversion of his dividend payment from the decentralized investment fund 702 into LTC. A trading limitation states the LTC is to be paid in a token-wrapped stablecoin on the chain 704. In implementations, the decentralized investment fund 702 will have to obtain the token-wrapped stablecoin to pay the token owner 706. Depending on market conditions, available liquidity on markets trading the native token of the chain 704 for the desired stabletoken could be very thin. If liquidity is very thin, the conversion between the native digital asset of the chain 704 and the desired stabletoken could be unfavorable to the token owner 706 (e.g., a high degree of price slippage). Since the decentralized investment fund 702 determines where the trade will take place, the token holder 706 is afforded protection against price slippage or unfavorable price by setting a maximum amount of price slippage against a price feed published by one or more oracles of the token holder's choosing. If the decentralized investment fund 702 cannot obtain the trade on terms that satisfy the conditions set out in instructions 710, then the decentralized investment fund 702 can pay the dividend in a fallback digital asset as specified by the token holder 706.

In another example, instructions 712 set out the rules desired by the token holder 706 for the conversion of his dividend payment from the decentralized investment fund 702 into ZEC. In the instructions 712, a trading limitation states that the ZEC be paid in a cross-chain bridge wherein ZEC is locked on its own chain and a representation of the locked ZEC is paid to the token holder's wallet address on the chain 704. The instructions 712 include a maximum price slippage against a price published by oracles of the token holder's choosing. The instructions 712 also include a timeout period until the dividend is paid in the fallback digital asset. Since market conditions are always changing, a trade on the terms set out in the instructions 712 may not be immediately available at the time of the dividend distribution from the decentralized investment fund 702 to the token holder 706. The timeout period is a period of time during which the decentralized investment fund 702 may monitor market conditions and execute the trade if the conditions are met. If the trading conditions have not been met by the end of the timeout period, the dividend payout can be made in the fallback digital asset (e.g., a digital asset native to the chain 704).

Figure 8:
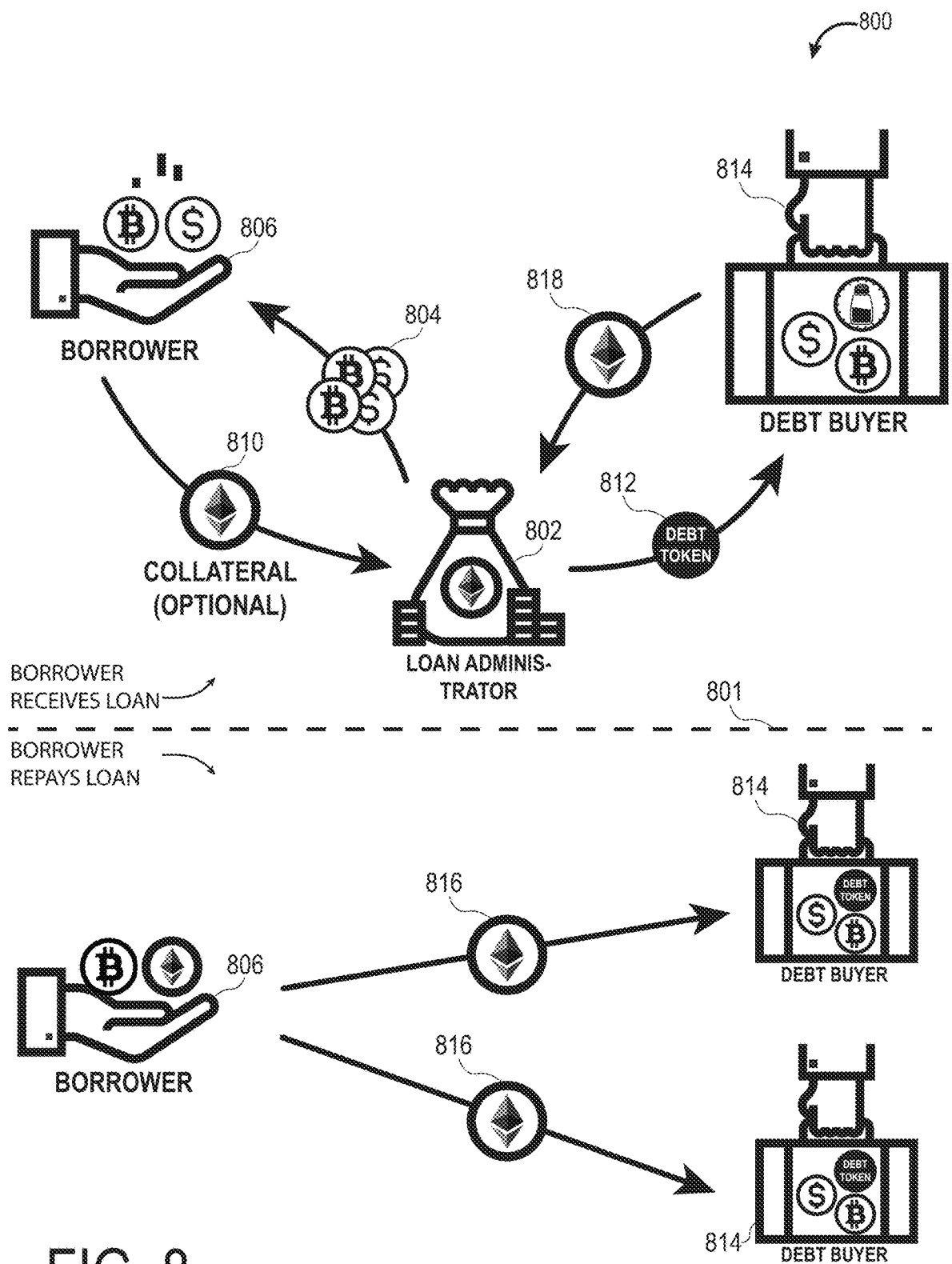
FIG. 8 is another diagram of an example system including a loan administrator with fund manager and investor participants with a multi-asset equity token.

FIG. 8 is a diagram of an example of originating a loan from a loan administrator 802 to a borrower 806 and selling a loan product based thereon to a buyer 814. FIG. 8 is divided by line 801 with the area above line 801 illustrating origination and sale of the loan and the area under line 801 illustrating repayment on the loan over time by the borrower 806.

The loan administrator 802 can be a centralized or decentralized entity. In one implementation the loan administrator 802 is a decentralized entity (e.g., a DAO) executing via a smart contract on a blockchain. The transactions described herein may be carried out by execution of the smart contract on the blockchain, based on input from users called authorized functions, oracle inputs, inputs from other smart contracts on the same blockchain, etc. Such a smart contract can hold funds itself on the blockchain and disbursement can be triggered the smart contract. In other implementations, the loan administrator 802 can be a centralized entity such as a loan manager. The loan manager can be an organization that performs the transactions described herein by confirming transactions to a blockchain of a digital asset, via traditional banking systems (e.g., fiat currency wire transfers, ACH transfers, etc.).

The loan administrator 802 originates a loan by sending proceeds 804 to the borrower 806. In an implementation, the loan is not based on a credit score of the borrower 806 issued by a credit rating agency. In some implementations, the loan is based on a credit assessment of the borrower (e.g., based on a history of past economic activity associated with an ETH account controlled by the borrower). Instead, the loan may be collateralized by collateral 810. In some implementations, the collateral 810 is a digital asset (e.g., a cryptocurrency) and the loan is a national currency (e.g., euros, dollars, pounds, etc.). In other implementations, the collateral 810 and the loan 804 are both digital assets. The loan is made to the borrower pursuant to a repayment schedule agreed to by the loan administrator 802 and the borrower 806. If the loan is collateralized, terms of the loan 804 may include a minimum loan-to-value (LTV) ratio that must be maintained to avoid liquidation of the collateral 810.

After the loan is in the repayment period, the loan administrator 802 may "package" the loan (and/or additional loans) into a transferable debt token 812. The debt token 812 may a transferable non-fungible token (e.g., an ERC721 token on the ethereum network) that is tracked by a smart contract of the loan administrator 802 (e.g., the smart contract that issued the debt tokens 812) by association to an address on a shared ledger or directly by the loan administrator 802. The terms of the loan may include periodic repayments of principal and interest to the shared ledger address associated with the loan token 812. If the loan administrator 802 sells the debt token 812 to a debt buyer 814 in return for a payment 818, then future periodic repayments on the loan in accordance with the loan terms will be paid to an address of the debt buyer 814 associated with the debt token 812.

As illustrated below line 804 on FIG. 8, the debt buyers 814 may collect periodic loan repayments 816 from the borrower 806. The debt buyer 814 or may sell the loan token 812 to another buyer 818. In some implementations, the smart contract used by the fund 802 to issue the loan token allows for splitting the loan token into smaller tokens (e.g., by a splitToken( ) function that burns a token and returns fractional parts of the token to a token sender). Subsequent repayments on the loan 804 may then be divided and paid to the owners of the fractional parts of the loan token 812. Fractional non-fungible token ownership may be handled in a smart contract by, for example, replacing an owner field of a list with a cardinality of one with no weighting parameter to a list of owners with relative weights. On the other hand, debt tokens 814 could be combined to form debt tokens that represent entitlement for repayment on a multitude of separate loans. This would allow the possibility of syndicating large loans.

The debt tokens 812 may be non-fungible tokens since the debt tokens 812 represent a specific loan. The debt tokens 812 can themselves be formed to specify terms of the debt such as the payment schedule, the current address that owns the NFT, etc. If periodic payments are to be made on the loan, the loan administrator 802 or another participant could provide an API to the borrower 806 to funnel the periodic loan repayments from the borrower 806 to the debt buyer 814.

The portion of FIG. 8 below line 804 illustrates repayment installments 816 on the loan from the borrower 806. The repayment 816 is received by an address associated with the loan token. If the loan token changes hands to debt buyer 818, then the repayment 816 will be made to the debt buyer 818. A borrower 806 may call a function on a smart contract that issued and manages the loan tokens 812 to determine which debt buyer 818 is the current owner of a loan token.

Figure 9:
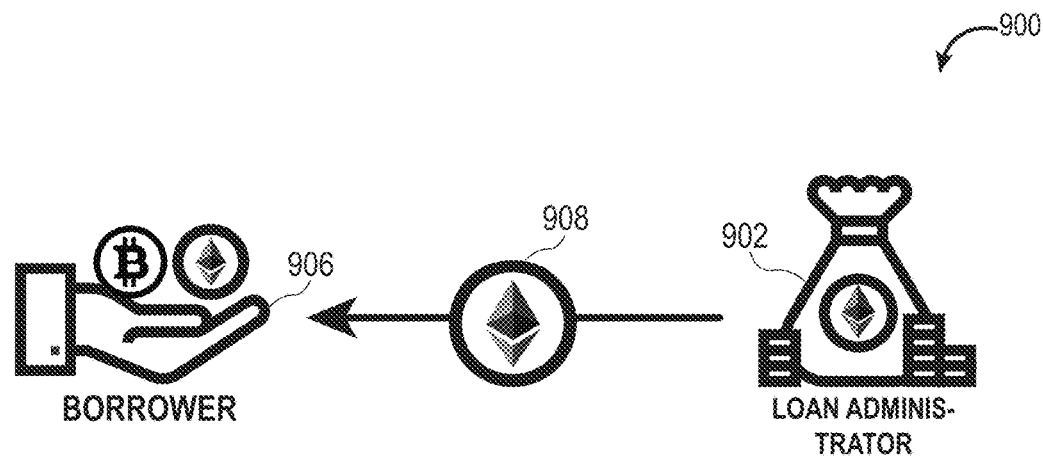
FIG. 9 is a diagram of an example loan administrator originating a loan to a borrower and selling a loan product based thereon to a buyer.
Figure 9:
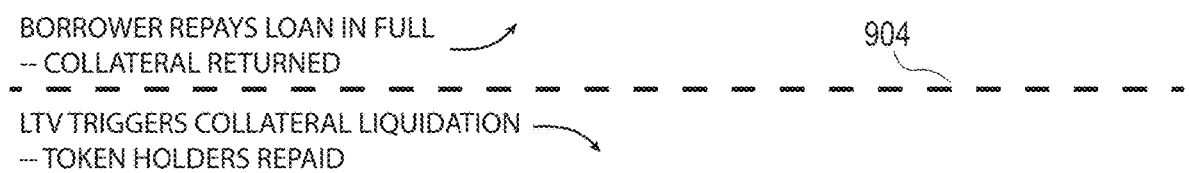
Figure 9:
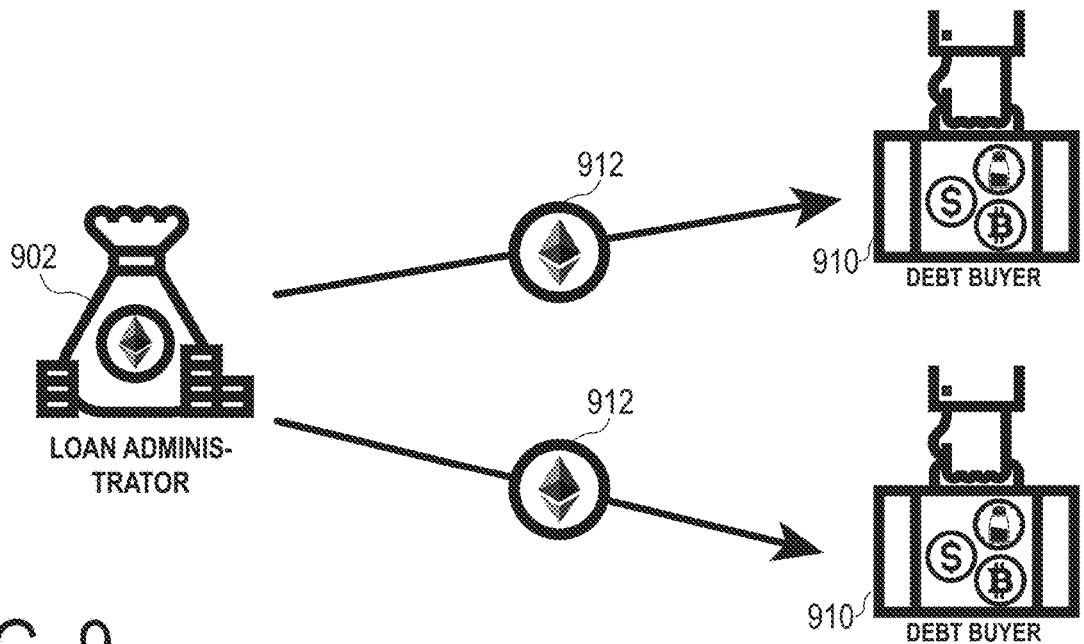

FIG. 9 is a diagram of a system 900 including an example loan administrator 902 selling and servicing a collateralized loan product. In FIG. 9 above the line 904, a case is illustrated wherein the borrower 906 completes repayment of a loan, and the loan administrator 902 returns a collateral payment 908 to the borrower 906. In FIG. 9 below the line 904 a loan-to-value (LTV) ratio triggers a collateral liquidation. The terms of the loan agreement may include a maximum LTV to avoid liquidation such as a 100% or higher collateralization rate. In implementations, a loan manager may request additional collateral and/or warn a borrower in advance of LTV liquidation. If a maximum LTV is 100%, then liquidation of the collateral by the fund 902 and disbursement of the collateral funds 912 to the debt buyers 910 may extinguish the loan. As such, the debt buyers 910 (e.g., wallet addresses controlled by the debt buyers 910 with which loan tokens are associated) will either receive regularly scheduled loan repayments or receive the remainder of the loan balance if the loan is liquidated.

There are multiple ways for the loan manager 902 to handle liquidations in the event the loan becomes delinquent. On-chain exchanges may be used where pools of liquidity determine exchange rates and the collateral 912 can be swapped for another digital asset. In other implementations, the collateral may be simply returned to the debt buyers 910.

Figure 10:
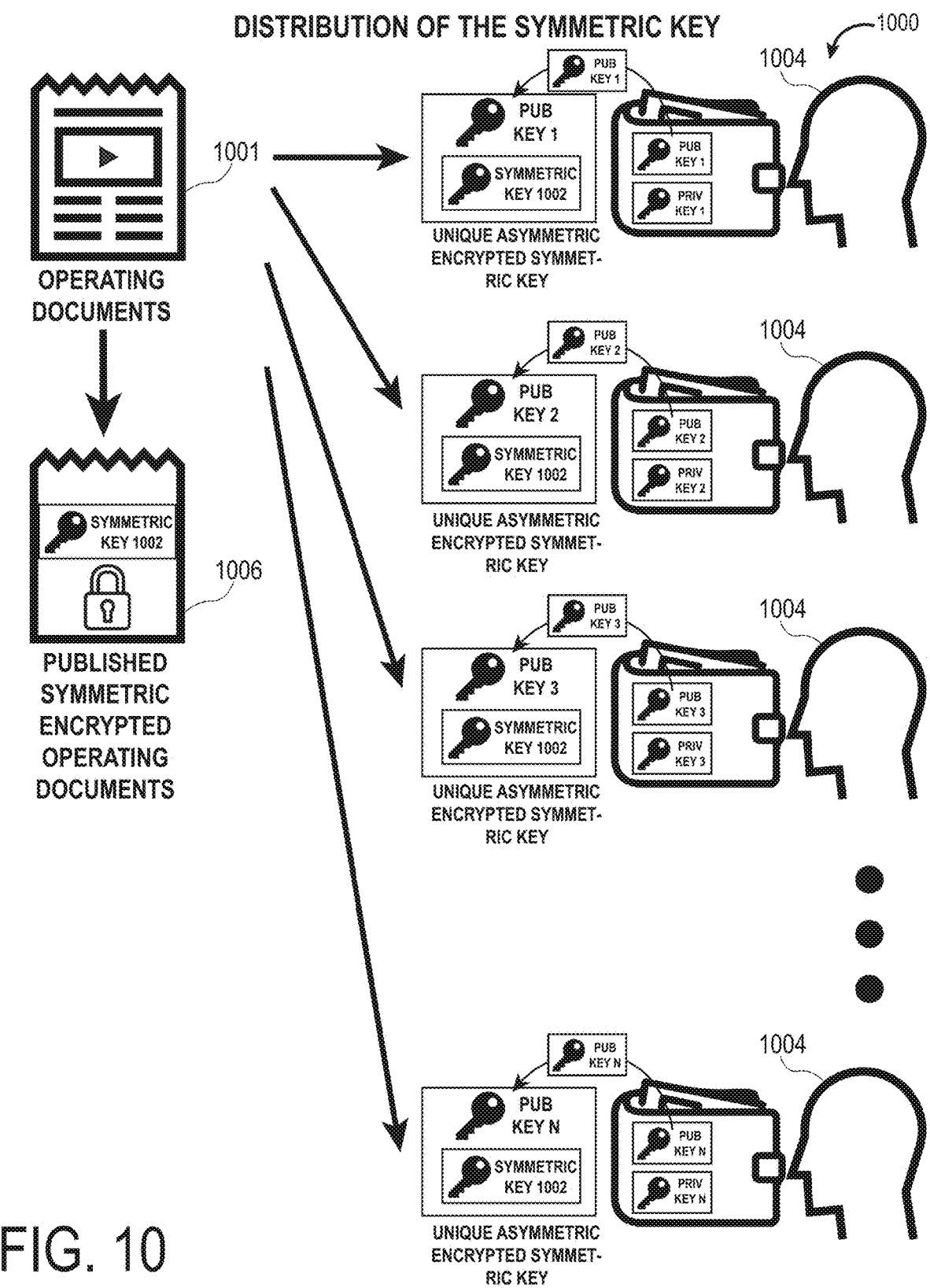
FIG. 10 is an implementation of decentralized investment fund operating documents distributed to token owners by symmetrically encrypting a published fund document and distributing the symmetric key to token owners by encrypting the symmetric key with a public key controlled by each token owner.

FIG. 10 is a diagram 1000 of an implementation of decentralized investment fund operating documents 1001 distributed to token owners 1004. During the course of operation of the decentralized investment fund, it may be necessary to disseminate information to the token holders 1004. The information may be disseminated in accordance with legal regulations governing aspects of the operation of the decentralized investment fund. Other uses of fund documents are also possible such as information on voting of the token holders 1004 (e.g., slates on decentralized investment fund managers, direct management of the investment fund, etc.).

To distribute the operating documents to the token holders securely, the system 1000 symmetrically encrypts a fund document 1001 with a symmetric key 1002 to yield an encrypted operating document 1006. The encrypted operating document 1006 is unlockable only with the same symmetric key 1002 used to encrypt the document. The system 1000 may publish the encrypted fund document 1006, which would not reveal the contents of the document to anyone who does not possess the symmetric key 1002.

Next, the system 1000 distributes copies of the symmetric key 1002 to the token holders 1004. To distribute the symmetric key 1002, the system 1000 asymmetrically encrypts a unique copy of the symmetric key 1002 using a token holder's public wallet address. For example, each token holder 1004 is associated with at least one wallet for holding the decentralized investment fund tokens. The wallet has a public key for which the token holder must hold a unique private key to sign transactions originating from the wallet. The system 1000 can use each wallet's public key to asymmetrically encrypt a copy of the symmetric key 1002 that is only unlockable by the owner of the wallet with the wallet's private key. In this way, the system 1000 can "airdrop" the symmetric key 1002 to each of the token holders. If the encrypted fund document 1006 is published or recorded on the same blockchain as the wallets of the token holders 1004, then each token holder can view the fund document without the need to store multiple copies (or even a single copy) of the fund document on the chain itself.

Figure 11:
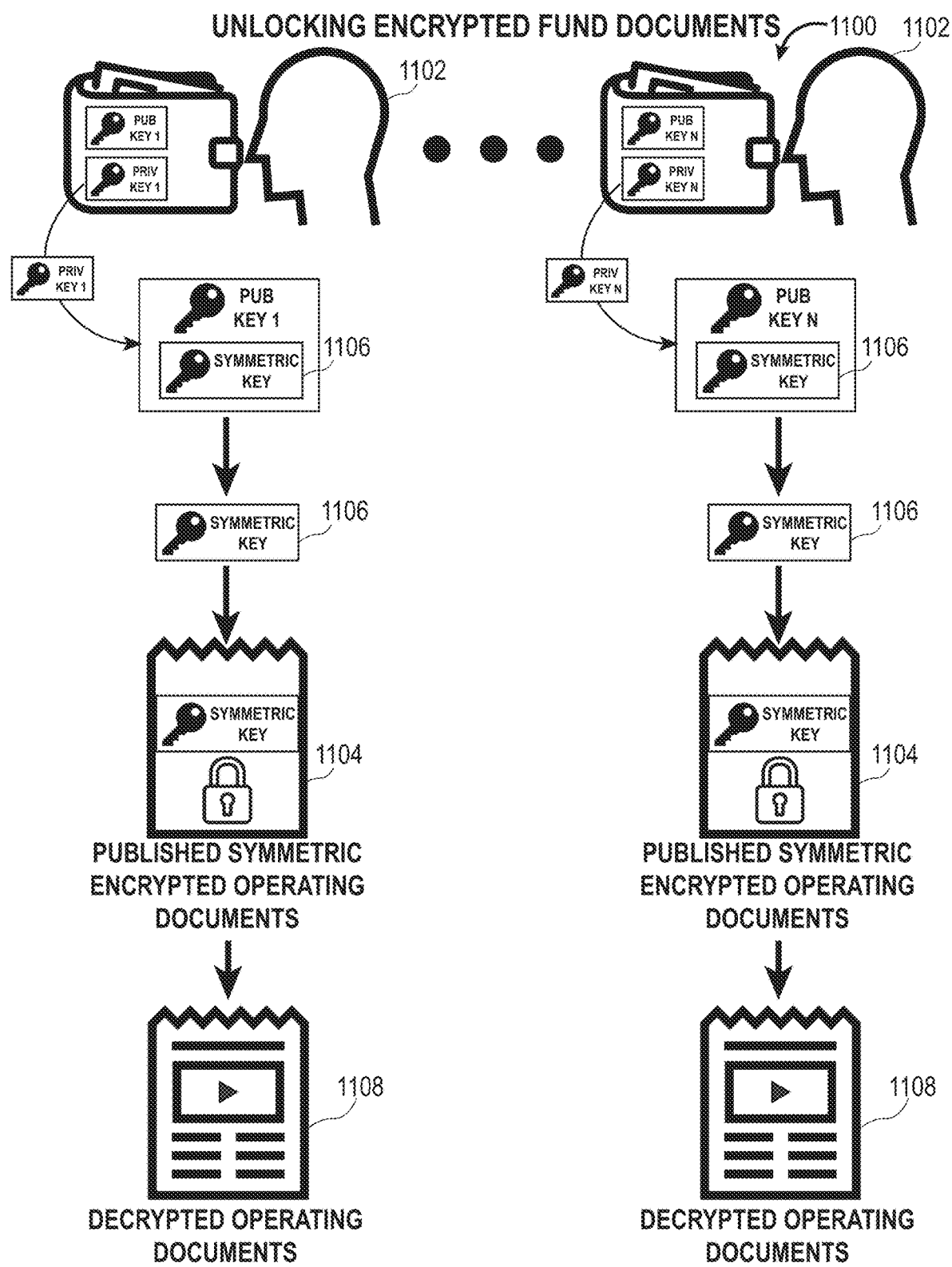
FIG. 11 is an implementation of decentralized investment fund token owners unlocking encrypted investment fund documents using a private key to decrypt a symmetric key needed to unlock the encrypted investment fund documents.

FIG. 11 is a diagram 1100 an implementation of decentralized investment fund token owners 1102 unlocking encrypted investment fund documents 1104 using a private key to decrypt the symmetric key 1106 needed to unlock the encrypted investment fund documents 1104. The token holders 1102 obtain a copy of the symmetric key 1106 encrypted with the public key of the token holder's wallet. The encrypted copy of the symmetric key 1106 may be stored on the shared ledger where the token holder 1102 can obtain it from querying a copy of the shared ledger or it may be communicated off-chain to the token holder 1102.

Once the token holder 1102 has a copy of the encrypted symmetric key 1106, the token holder 1102 can decrypt the symmetric key 1106 using the corresponding private key of the token holder's wallet to yield an unencrypted copy of the symmetric key 1106. The unencrypted symmetric key 1106 can then be used to unlock the encrypted operating documents 1104 to yield a readable copy of the fund documents 1108.

Figure 12:
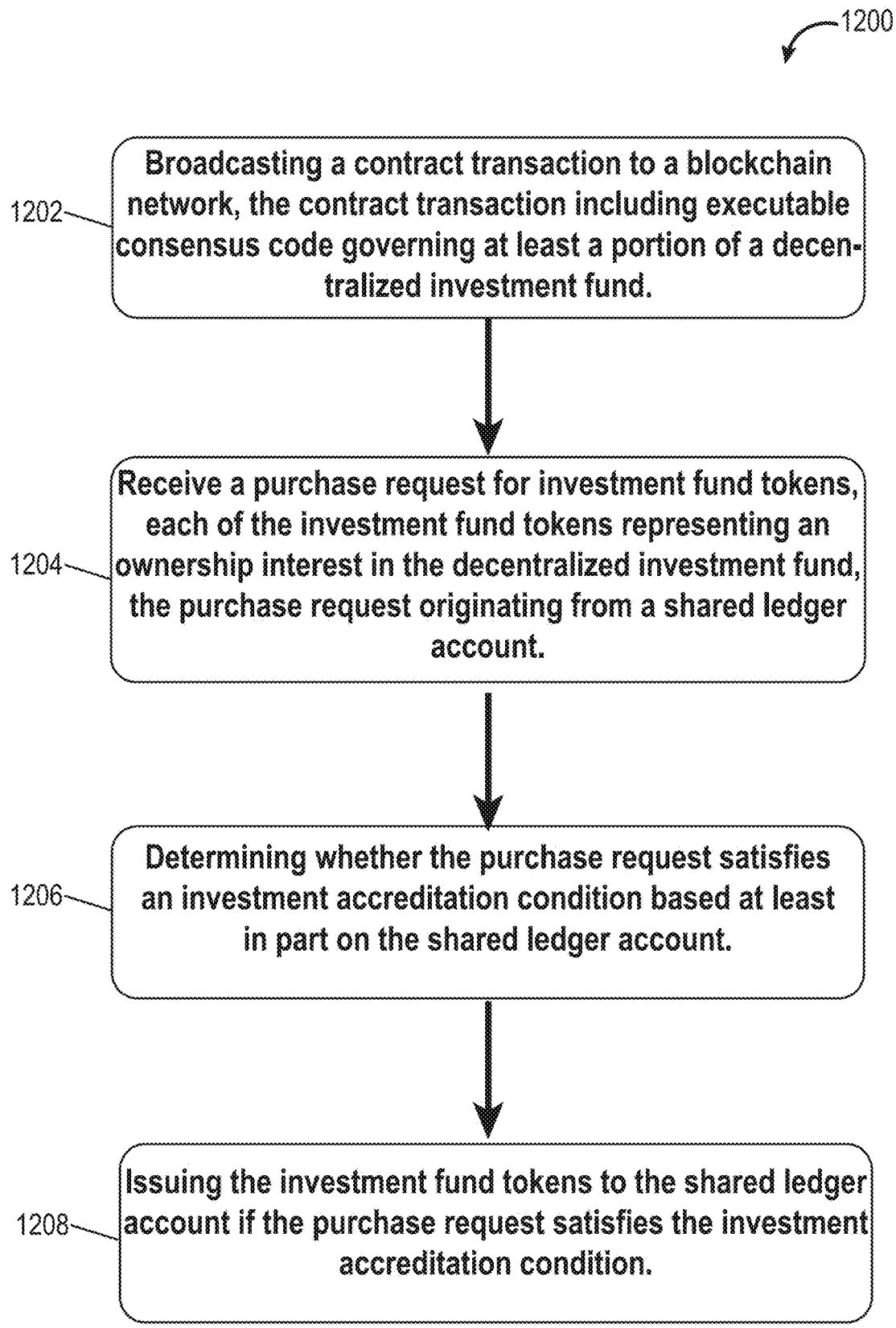
FIG. 12 illustrates example operations for issuing a decentralized investment fund token.

FIG. 12 illustrates example operations 1200 for issuing a decentralized investment fund token. A broadcasting operation 1202 broadcasts a contract transaction to a blockchain network, the contract transaction including executable consensus code governing at least a portion of a decentralized investment fund. The contract transaction, if confirmed by the blockchain network, may implement a token and provide callable functions to participants in the decentralized investment fund.

A receiving operation 1204 receives a purchase request for investment fund tokens, each of the investment fund tokens representing an ownership interest in the decentralized investment fund. The purchase request may originate from an address on the public ledger of the blockchain network, in which case the request identifies the owner of a private key corresponding to the address as the candidate purchaser of the investment fund tokens. The purchase request may include a request for a number of tokens to be purchased with funds in the address on the public ledger and for purchased investment fund ownership tokens to be sent thereto (e.g., an ERC-20 token on the Ethereum network). In another implementation, the purchase request is made off-chain to an entity involved in the management of the decentralized investment fund (e.g., a fund manager with authority to issue tokens).

In some legal jurisdictions the investment fund ownership token may be classified as a security and subject to restrictions regarding promotion of the investment fund ownership token and restrictions on who may purchase the investment fund ownership token. A candidate purchaser who is permitted to purchase the token may be referred to as an accredited investor. Accredited investor requirements may include proof of total net worth or proof of income.

A determining step 1206 determines whether the purchase request satisfies an investment accreditation condition based at least in part on the shared ledger account. Since the shared ledger account is viewable by the decentralized investment fund, accreditation status may be determined based on examination of a copy of the shared ledger. If the candidate purchaser can prove accreditation status based on exceeding a minimum net worth, the minimum net worth could be proven if a sufficient amount of digital asset funds are held by the shared ledger account that sent the purchase request to the decentralized investment fund. If the purchase request for tokens is sent off-chain, then the owner of an account on the shared ledger can sign a message proving ownership of the account and submit it to the decentralized investment fund outside of the shared ledger.

In another implementation, the determining step 1206 examines a copy of the shared ledger to determine a payment history to the account on the shared ledger that submitted the purchase request. If the account on the shared ledger has received periodic payments (e.g., an income) for a sufficient period based on the relevant legal jurisdiction, then the determining step 1206 may determine that the owner of the account on the shared ledger satisfies the accreditation requirement. In yet another implementation, the owner of the account on the shared ledger may sign a message attesting to accreditation status. Such an attestation may be sufficient to show accreditation depending on the relevant legal jurisdiction.

An issuing step 1208 issues investment fund token to the shared ledger account if the purchase request satisfied the investment accreditation condition. In implementations, the issuing step 1208 includes transferring investment fund tokens to the shared ledger account only upon payment of capital into the investment fund. In other implementations, the payment of capital from the token purchase candidate may be made as part of the purchase request such that the fund can be returned if accredited status is not shown.

Figure 13:
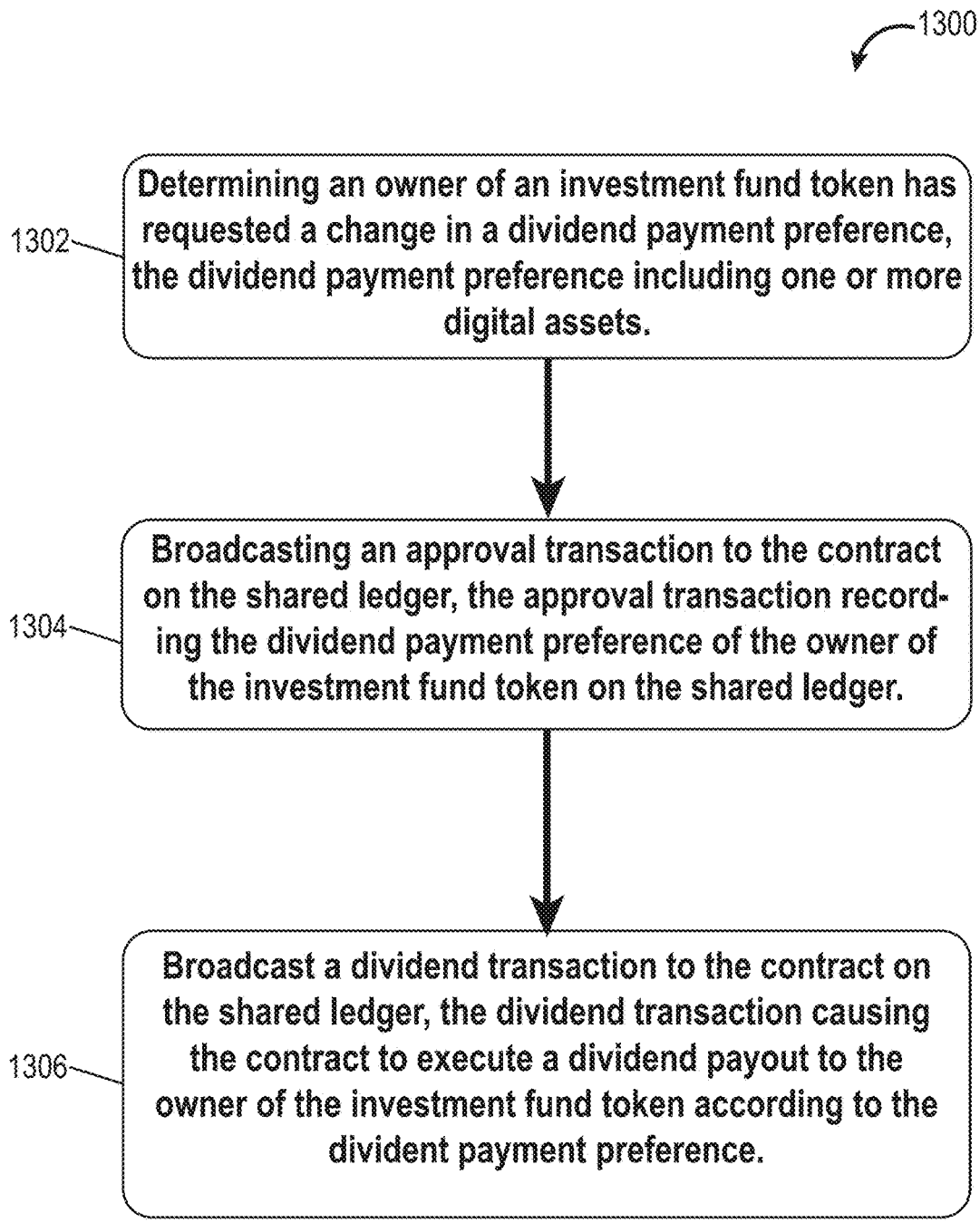
FIG. 13 illustrates example operations for issuing a decentralized investment fund ownership token with dividend payout.

FIG. 13 illustrates example operations 1300 for issuing a decentralized investment fund ownership token with dividend payout. A determining operation 1302 determines an owner of an investment fund token has requested a change in dividend payment preference, the dividend payment preference including one or more digital assets. In an implementation the determining operation 1302 checks a status of a contract on a shared ledger that stores the payment preferences of the respective token holders. For example, a token holder may broadcast a transaction to a network of the shared ledger sending data to the contract and paying for the contract to write the token holder's dividend payment preference to the chain. In other implementations, the dividend payment preference may be communicated to the decentralized investment fund off-chain.

A broadcasting operation 1304 broadcasts an approval transaction to the contract on the shared ledger recording the dividend payment preference of the owner of the investment fund token. Recording the dividend payment preference on the contract permits public inspection of the dividend payment preferences by anyone with access to a copy of the shared ledger. In this sense, the decentralized investment fund tokens are non-fungible tokens because each token can be associated with its own dividend payment preferences. A potential buyer of the token can check the shared ledger to see the parameters of the dividend payout for any token. If the token holder has requested dividend payment preferences that are unacceptable to the decentralized investment fund, then the fund may reject the dividend payment preferences and decline the broadcasting operation 1304.

The dividend payment preference may include multiple pieces of preference information. In one example, the dividend payment preference includes a ratio of digital assets in which the dividend is desired to be paid. In other examples, the dividend payment preference includes a maximum acceptable price slippage amount for acquisition of the desired digital asset. If the dividend to be paid is large and liquidity on a market to obtain the payout digital asset is thin, then obtaining the digital asset to be paid out can "eat up" an orderbook in a way that is detrimental to the exchange rate. Slippage rate can be calculated before an order is placed by analyzing the order book. If the slippage rate would be higher than the dividend payment preference, the decentralized investment fund may deem the trade unable to be completed.

Other pieces of information in the dividend payment preferences include price feed oracles for determining the market exchange rate between the native token on the shared ledger of the decentralized investment fund and the digital asset to be paid out by the dividend. The price feed oracle(s) may serve as a basis to calculate the slippage rate on any particular trade executed by the decentralized investment fund to obtain digital assets to pay out as dividends. The dividend payment preferences may include authorized markets in which the decentralized investment fund may obtain the digital assets to be paid out. The dividend payment preference information may include the method by which the desired asset is to be paid to the token holder (e.g., cross-chain bridge, stabletoken, same-chain transfer, provable transaction on a different chain, etc.). The dividend payment information may further include a timeout period after which the dividend payment may be made in a specified fallback digital asset if the conditions of the dividend payment preferences cannot be met during the timeout period.

Another broadcasting operation 1306 broadcasts a dividend transaction to the contract on the shared ledger, the dividend transaction causing the contract to execute a dividend payout to the owner of the investment fund token according to the dividend payment preference.

Figure 14:
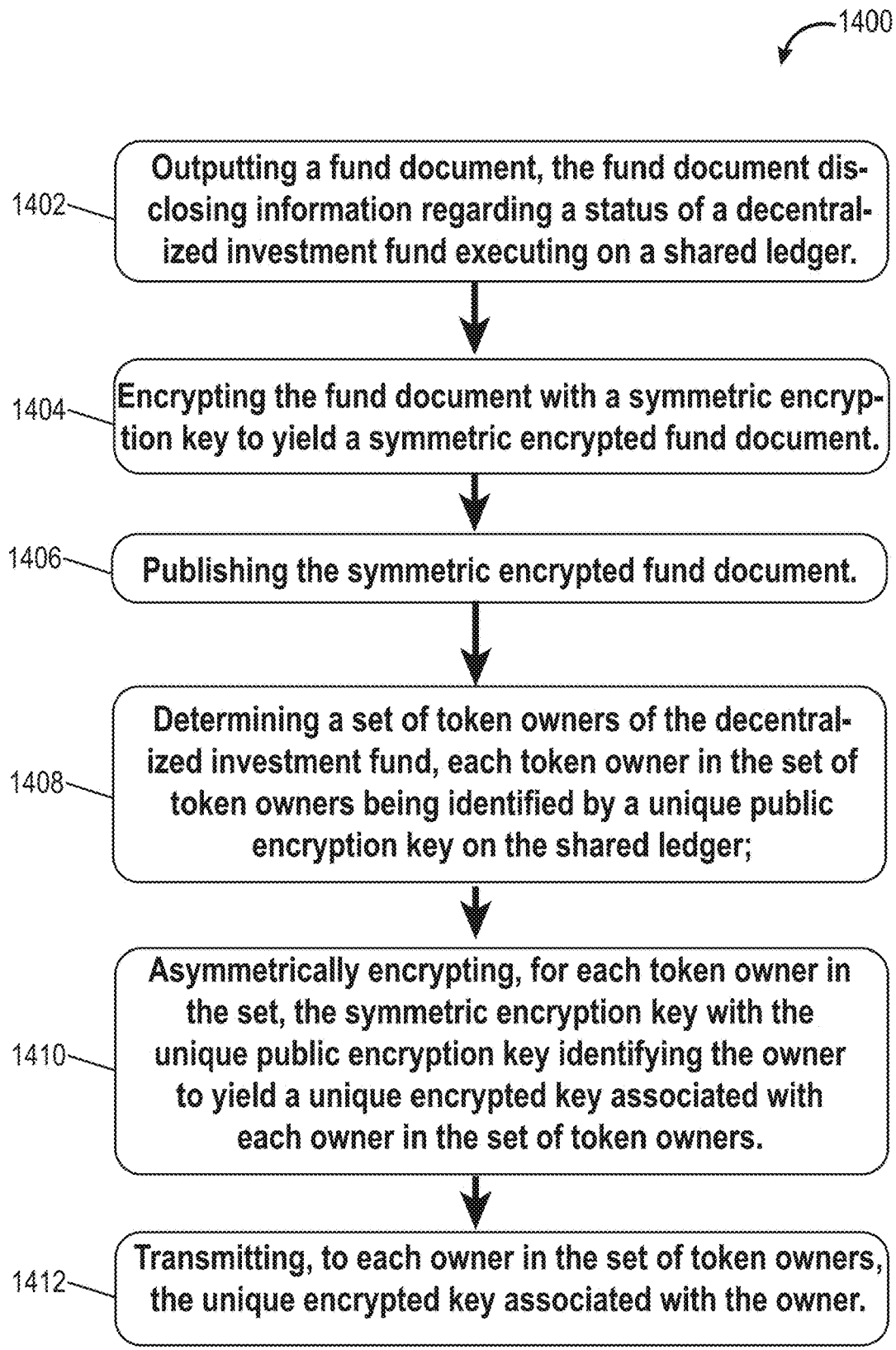
FIG. 14 illustrates example operations for disseminating decentralized investment fund operating documents to token owners.

FIG. 14 illustrates example operations 1400 for disseminating decentralized investment fund operating documents to token owners. An outputting operation 1402 outputs a fund document, the fund document disclosing information regarding a status of a decentralized investment fund executing on a shared ledger. The fund document may include financial status information, historical fund performance information, voting information, etc.

An encrypting operation 1404 encrypts the fund document with a symmetric encryption key to yield a symmetric encrypted fund document. The symmetric encrypted fund document can only be unlocked with the same key as used in the encrypting operation 1404. A publishing operation 1406 publishes the symmetric encrypted fund document. The publishing operation 1406 may include writing the encrypted fund document to the shared ledger of the decentralized investment fund or providing the fund to token holders off-chain (e.g., posting on a website).

A determining operation 1408 determines a set of token owners of the decentralized investment fund, each token owner in the set of token owners being identified by a unique public encryption key on the shared ledger. In an implementation, the unique public encryption key is, or is derived from, a wallet address associated with the token holder on the shared ledger. One way to associate a wallet address with a token holder is to check the contract of the decentralized investment fund, which tracks ownership of the tokens by wallet address on the shared ledger.

An encrypting operation 1410 asymmetrically encrypts, for each token owner in the set, the symmetric encryption key with the unique public encryption key identifying the owner to yield a unique encrypted key associated with each owner in the set of token owners. A transmitting operation 1412 transmits, to each owner in the set of token owners, the unique encrypted key associated with the owner. The transmitting operation may be performed by writing the encrypted symmetric key to the shared ledger, by transmitting the encrypted key off-chain, etc.

Figure 15:
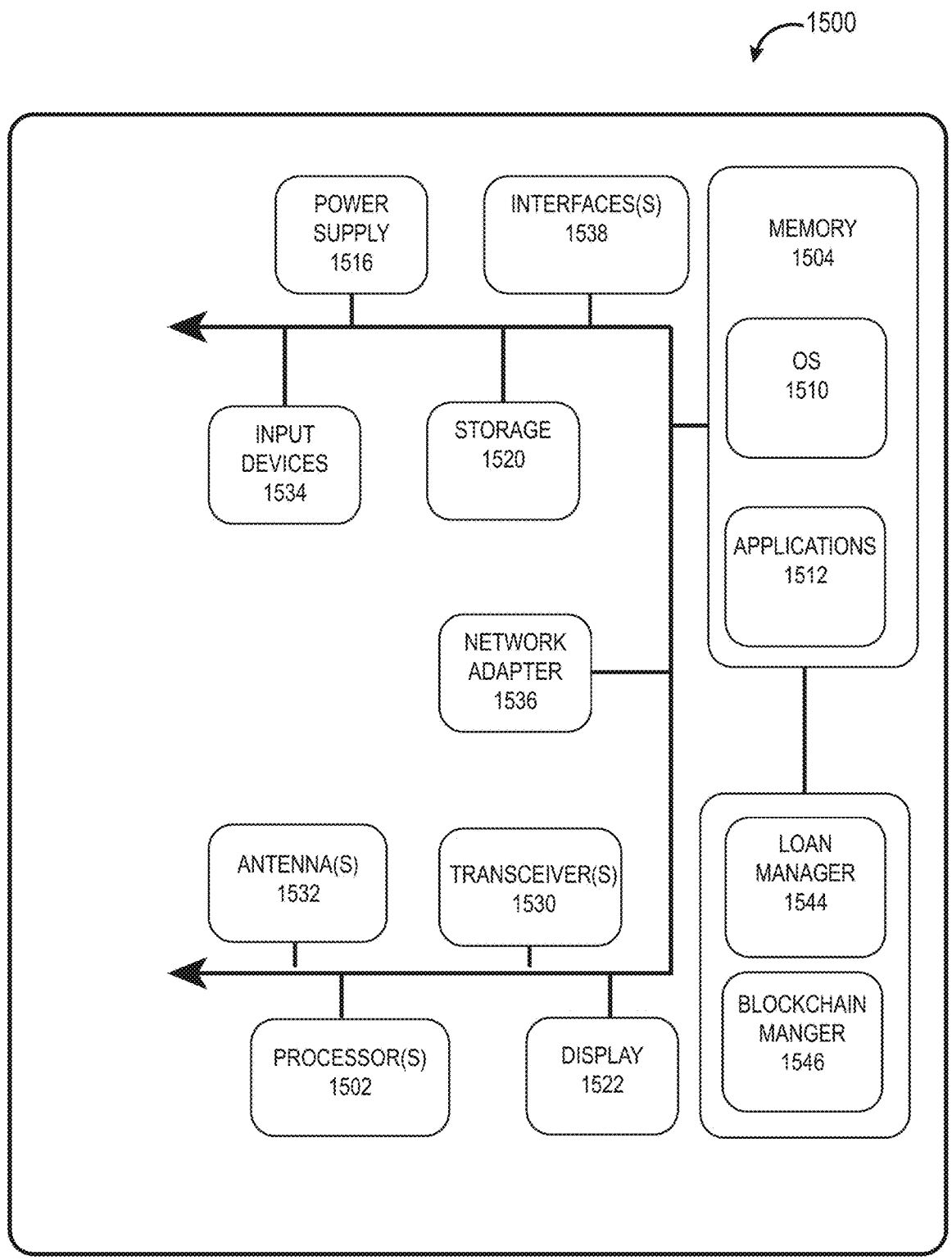
FIG. 15 is a diagram of a system that may be useful for implementing a decentralized investment fund with equity token ownership.

FIG. 15 illustrates an example system 1500 that may be helpful in using the digital asset collateral wallet. FIG. 15 illustrates an example system (labeled as a processing system 1500) that may be useful in implementing the described technology. The processing system 1500 may be a client device, such as a smart device, connected device, Internet of Things (IoT) device, laptop, mobile device, desktop, tablet, or a server/cloud device. The processing system 1500 includes one or more processor(s) 1502, and a memory 1504. The memory 1504 generally includes both volatile memory (e.g., RAM) and non-volatile memory (e.g., flash memory). An operating system 1510 resides in the memory 1504 and is executed by the processor 1502.

One or more application programs 1512 modules or segments, such as loan manager 1544 and blockchain manager 1546 are loaded in the memory 1504 and/or storage 1520 and executed by the processor 1502. In some implementations, the trusted execution environment 1544 is stored in read only memory (ROM) 1014 or write once, read many (WORM) memory. Data such as loan terms may be stored in the memory 1504 or storage 1520 and may be retrievable by the processor 1502 for use by loan manager 1544 and the blockchain manager 1546, etc. The storage 1520 may be local to the processing system 1500 or may be remote and communicatively connected to the processing system 1500 and may include another server. The storage 1520 may store resources that are requestable by client devices (not shown). The storage 1520 may include secure storage such as one or more platform configuration registers (PCR) manages by one or more trusted platform modules (TPMs), which may be implanted in a chip or by the trusted execution environment TEE.

The processing system 1500 includes a power supply 1516, which is powered by one or more batteries or other power sources and which provides power to other components of the processing system 1500. The power supply 1516 may also be connected to an external power source that overrides or recharges the built-in batteries or other power sources.

The processing system 1500 may include one or more communication transceivers 1530 which may be connected to one or more antenna(s) 1532 to provide network connectivity (e.g., mobile phone network, Wi-Fi®, Bluetooth®, etc.) to one or more other servers and/or client devices (e.g., mobile devices, desktop computers, or laptop computers). The processing system 1500 may further include a network adapter 1536, which is a type of communication device. The processing system 1500 may use the network adapter 1536 and any other types of communication devices for establishing connections over a wide-area network (WAN) or local area network (LAN). It should be appreciated that the network connections shown are exemplary and that other communications devices and means for establishing a communications link between the processing system 1500 and other devices may be used.

The processing system 1500 may include one or more input devices 1534 such that a user may enter commands and information (e.g., a keyboard or mouse). Input devices 1534 may further include other types of input such as multimodal input, speech input, graffiti input, motion detection, facial recognition, physical fingerprinting, etc. These and other input devices may be coupled to the server by one or more interfaces 1538 such as a serial port interface, parallel port, universal serial bus (USB), etc. The processing system 1500 may further include a display 1522 such as a touch screen display.

The processing system 1500 may include a variety of tangible processor-readable storage media and intangible processor-readable communication signals including in virtual and/or cloud computing environment. Tangible processor-readable storage can be embodied by any available media that can be accessed by the processing system 1500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1500. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

What is claimed:

1. A method of issuing a requested number of ownership tokens of a decentralized investment fund operating on a shared ledger of a blockchain network, the method comprising:
broadcasting a token sale transaction as a smart contract on the blockchain network from a wallet address associated with at least one entity of the fund; and
calling a plurality of functions of the smart contract including:
calling a receiving function of the smart contract that includes receiving a purchase request from a candidate purchaser for the requested number of ownership tokens from a wallet address associated with an account on the shared ledger and identifying the candidate purchaser as an owner of a private key corresponding to the wallet address on the shared ledger;
calling a determining function of the smart that includes determining whether the candidate purchaser satisfies an investment accreditation condition based at least in part on the account on the shared ledger including determining receipt of a payment of capital based on the requested number of tokens into the fund from the candidate purchaser and determining at least one of: (i) digital asset funds held by the account of the candidate purchaser exceeding a minimum; and (ii) minimum income received over a defined period of time;
calling an issuing function of the smart contract when the determining function determines that the candidate purchaser satisfies the investment accreditation that includes transferring the requested number of tokens to the account on the shared ledger and identifying the candidate purchaser as a token holder; and
calling a disseminating function of the smart contract that includes outputting a fund document on the shared ledger, the outputting includes:
symmetrically encrypting the fund document with a symmetric key that yields an encrypted operating document that is only unlockable with the symmetric key, the symmetrically encrypting implemented by at least one processing system;

writing the encrypted operating document on the shared ledger;

asymmetrically encrypting a copy of the symmetric key using a public key corresponding to the wallet address on the shared ledger to define a unique encrypted key for the token holder which decrypts using the private key corresponding to the wallet address on the shared ledger, the asymmetrically encrypting implemented by the at least one processing system; and writing the encrypted copy of the symmetric key and the unique encrypted key to the shared ledger for unlocking the encrypted operating document and yielding a readable copy of the fund document.

2. The method of claim 1, wherein the determining digital asset funds held by the account of the candidate purchaser exceeding a minimum includes determining cryptographic proof of ownership of a spendable digital asset, the value of the spendable digital asset exceeding a minimum investment accreditation wealth requirement.

3. The method of claim 2, wherein the determining function includes determining function includes determining that the spendable digital asset has been unspent for longer than a minimum wealth ownership period of time.

4. The method of claim 1, wherein the determining function includes determining cryptographic proof of ownership of a payment address for the account on the shared ledger, the payment address having a payment history exceeding a minimum investment accreditation income requirement.

5. The method of claim 1, wherein the determining function includes determining receipt of a cryptographically signed digital message associated with the account on the shared ledger, the digital message attesting that the investment accreditation is satisfied with respect to the purchase request.

6. The method of claim 1, further comprising calling a dividend payment function of the smart contract that includes payment of a dividend in an asset tracked on a different shared ledger from the shared ledger of the blockchain network.

7. The method of claim 6, wherein calling the dividend function includes receiving a request to change in a dividend payment preference including one or more digital assets; broadcasting an approval transaction recording the dividend payment preference on the shared ledger of the blockchain network; and broadcasting a dividend transaction to the contract on the shared ledger of the blockchain network; and executing a dividend payout to the owner of the account on the shared ledger of the blockchain network according to the dividend payment preference.

8. The method of claim 7, wherein the dividend payment preference includes a maximum amount of price slippage with respect to the one or more digital assets.

9. The method of claim 7, wherein the dividend payment preference includes a market for obtaining the one or more digital assets.

10. The method of claim 7, wherein the determining operation is based at least in part on a state of the shared ledger.

11. The method of claim 7, wherein the dividend payment preference includes a timeout period and at least one fallback digital asset.

12. The method of claim 7, wherein the dividend payment preference includes at least one digital asset not tracked on the shared ledger of the blockchain network.

13. The method of claim 12, wherein the dividend payout includes the at least one digital asset not tracked on the shared ledger of the blockchain network, the dividend payout being made according to a cross-chain bridge.

14. The method of claim 12, wherein the dividend payout includes payment in a stabletoken tracked on the shared ledger of the blockchain network, the stabletoken being pegged to a value of the at least one digital asset not tracked on the shared ledger.

15. The method of claim 12, wherein the dividend payout includes the at least one digital asset not tracked on the shared ledger of the blockchain network, the dividend payout being made according to an inter-chain relay.

16. The method of claim 12, wherein the dividend payout of the at least one digital asset not tracked on the shared ledger of the blockchain network, is verified by the contract as paid according to a simplified payment verification contract on the shared ledger, the simplified payment verification contract including block headers and a subset of transactions associated with the digital asset not tracked on the shared ledger.

17. The method of claim 1, wherein calling the disseminating function includes determining a set of token owners with each token owner in the set of token owners being identified by a unique public encryption key derived from a wallet address associated with the token holder on the shared ledger; asymmetrically encrypting copies of the symmetric key with the unique public encryption keys identifying the set of token owners to yield a unique encrypted key associated with each owner in the set of token owners; and transmitting, to each token owner in the set of token owners, the unique encrypted key associated with the owner.

18. The method of claim 17, wherein the transmitting includes writing a double-encrypted key to the shared ledger.

19. The method of claim 17, wherein the transmitting includes a blockchain whisper message.

20. The method of claim 17, wherein the fund document is a set of copies of the fund document, each copy of the fund document including a unique token owner identifier.

* * * * *